United States Patent
Crandon et al.

(10) Patent No.: US 7,734,496 B1
(45) Date of Patent: Jun. 8, 2010

(54) SERVICE PROVIDER AND CLIENT SURVEY METHOD

(75) Inventors: Laura Crandon, Glenn Dale, MD (US); Louis A. Venezia, Morristown, NJ (US); King Yun Lo, Olney, MD (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1577 days.

(21) Appl. No.: 10/793,298

(22) Filed: Mar. 4, 2004

(51) Int. Cl.
G06Q 90/00 (2006.01)
(52) U.S. Cl. ...................................... 705/10
(58) Field of Classification Search .................. 705/10
See application file for complete search history.

(56) References Cited

U.S. PATENT DOCUMENTS

| | | | |
|---|---|---|---|
| 6,687,560 B2 * | 2/2004 | Kiser et al. | 700/108 |
| 6,859,784 B1 * | 2/2005 | van Duyne et al. | 705/10 |
| 6,970,831 B1 * | 11/2005 | Anderson et al. | 705/11 |
| 7,313,531 B2 * | 12/2007 | Chappel et al. | 705/7 |
| 2002/0029159 A1 * | 3/2002 | Longden | 705/7 |
| 2002/0173934 A1 * | 11/2002 | Potenza | 702/182 |
| 2003/0055718 A1 * | 3/2003 | Cimini et al. | 705/11 |
| 2003/0061006 A1 * | 3/2003 | Richards et al. | 702/182 |
| 2003/0145006 A1 * | 7/2003 | Dalfsen et al. | 707/10 |
| 2004/0093257 A1 * | 5/2004 | Rogers et al. | 705/10 |
| 2004/0117237 A1 * | 6/2004 | Arora | 705/10 |
| 2004/0172272 A1 * | 9/2004 | Shillinglaw et al. | 705/1 |
| 2004/0177002 A1 * | 9/2004 | Abelow | 705/14 |
| 2004/0230464 A1 * | 11/2004 | Bliss et al. | 705/7 |

OTHER PUBLICATIONS

Ching-Chow Yang, "Establishment and Applications of the Integrated Model of Service Quality Measurement," Managing Service Quality 13:4 (2003) pp. 310-324.*
USAID Center for Development Information and Evaluation, "Conducting Customer Service Assessments," Performance Monitoring and Evaluation Tips 9 (1996).*

* cited by examiner

Primary Examiner—Beth V. Boswell
Assistant Examiner—Neil R Kardos
(74) Attorney, Agent, or Firm—Hanley, Flight and Zimmerman, LLC

(57) ABSTRACT

An improved survey method is disclosed for evaluating the satisfaction of a client with the services and support provided by a service provider. The survey method includes first surveying at least one representative of a service provider providing a service to a client. A plan is then developed for the client based on survey data from the service provider representative survey to address at least one aspect of the provided service requires changing. The developed plan is then presented to the client. A second survey is then taken of at least representative of the client based on performance of the service provider and the developed plan. The survey method advantageously exploits the knowledge of those service provider representatives that provide a service to the client for identifying advantageous modifications of the service or support areas before presenting the client with a survey. In such manner, such survey results would enable a service provider to more quickly implement a plan for service changes that would likely increase client satisfaction with a single or reduced number of client surveys.

18 Claims, 3 Drawing Sheets

SERVICE PROVIDER AND CLIENT SURVEY METHOD

FIELD OF THE INVENTION

The invention relates generally to a client satisfaction survey method and more particularly to a computer implemented method for surveying a client regarding the level of satisfaction with the value and services received from a service provider.

BACKGROUND

Service providers in many industries rely upon client satisfaction surveys in one form or another to obtain feedback regarding how their clients perceive their performance in providing such services and corresponding support. For example, information technology service providers have employed client satisfaction surveys to gain an understanding of level of satisfaction that clients have with their provided service and support. In this manner, such information technology service providers can determine whether areas or facets of their provided service and support need improvement.

Typically, existing client satisfaction surveys are comprised of questions related to the provided service with the survey taker responding by selecting one of multiple choices directed to respective levels of satisfaction. Such surveys are often distributed in paper form to employees of a client, or electronically through an electronic mail system implemented on internal computer network. Additionally, client employees have been invited to take multiple choice electronic surveys at websites over the Internet.

The results of such surveys are then evaluated and the resulting information is often graphically depicted to facilitate understanding as to those service and support areas with high satisfaction and those service or support areas where improvement may be needed. client satisfaction surveys are often given periodically to ascertain whether such changes have improved client satisfaction those service or support areas needing attention, as well as to identify other service areas needing improvement. Commercially available conventional on-line computer-based software tools for creating the questions of client satisfaction surveys and evaluating survey results include, for example, Zoomerang from MartketTools, Inc. and SelectSurveyASP from ClassApps.com.

However, existing client satisfaction survey tools disadvantageously provide limited options to service providers. For example, a service provider that implemented a remedial change in the service or support it provides must await the results of a subsequent client satisfaction survey to identify if such changes had improved client satisfaction. Moreover, it is often difficult to respond with effective remedial changes as quickly as service providers would like because it would likely require a burdensome number of surveys taken by the client over a period of time. Accordingly, an improved survey method is desired by industries to allow service providers to adapt their services and support for improving client satisfaction without imposing a burdensome number of surveys on the client.

SUMMARY OF THE INVENTION

An improved computer-based survey method of the invention overcomes the previously described disadvantages of existing client satisfaction survey methods. The improved survey method according to the invention includes surveying at least one representative of a service provider providing a service to a client. A plan is then developed for the client based on survey data from the service provider representative survey to address at least one aspect of the provided service that requires changing, if any. The developed plan is then presented to the client. A survey is then taken of at least one representative of the client based on performance of the service provider and the developed plan.

The invention advantageously develops a plan, such as a remedial plan, based on a first survey of the service provider representatives that provide a service to the client and the client is then provided a survey that inquires about the service provider's performance as well as the proposed plan. Accordingly, the invention advantageously exploits the knowledge of those service provider representatives that provide a service to the client for identifying advantageous modifications of the service or support areas before presenting the client with a survey. In such manner, such survey results would enable a service provider to more quickly implement a plan for service changes that would likely increase client satisfaction with a single or reduced number of client satisfaction surveys.

In accordance with another aspect of the invention, the client survey is designed and the responses are analyzed in manner to distinguish between response scores from value-based survey questions and service-based questions. In particular, a services-based weighted average score based on client responses to service-related survey questions is determined and correspondingly, a value-based weighted average score based on client responses to value-related survey questions is determined. In this manner, it would be possible to determine more accurately how the client values its service provider relationship.

Exemplary service providers that may take advantage of the business-to-business invention include information technology services, internal and customer call center services, such as for providing helpdesk services, employee and/or retirement benefit services, marketing, and human resources.

BRIEF DESCRIPTION OF THE DRAWINGS

These and other aspects of exemplary systems and methods according to the principles of the invention are disclosed with reference to the drawings, in which.

DETAILED DESCRIPTION

Figure 1:
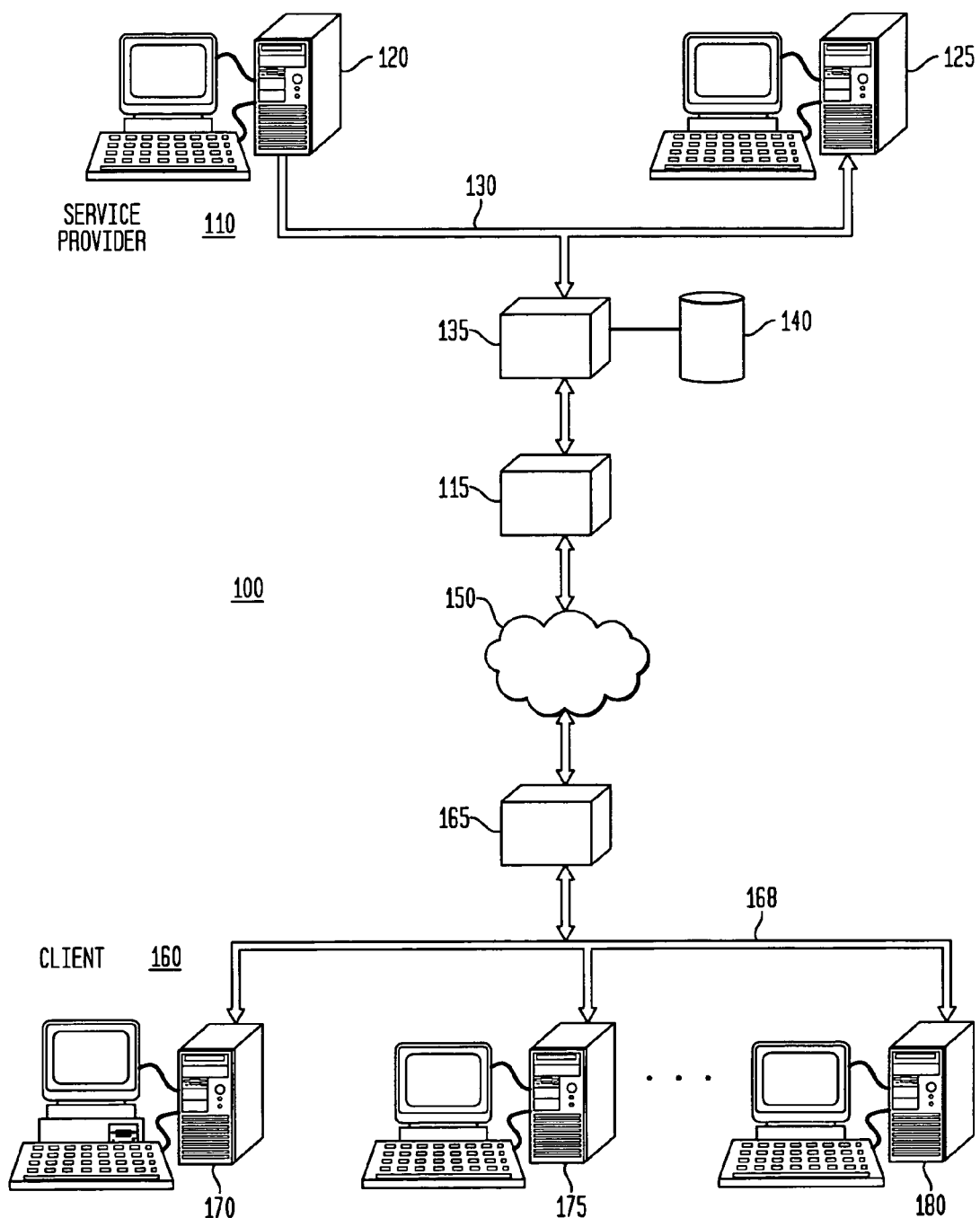
FIG. 1 is a block diagram of an exemplary system for implementing the principles of the invention.

FIG. 1 illustrates a schematic block diagram of an exemplary configuration 100 for implementing the improved survey method according to the invention. The configuration 100 includes a service provider data network system 110 and a client data network system 160 connected to the publicly-accessible Internet and/or electronic mail network 150. The client that uses the network system 160 receives services or support from the service provider operating the network system 110.

The service provider network 110 includes service provider computers 120 and 125 coupled to a computer 135 via network 130. The computers 120 and 125 are used by service provider representatives that, for example, directly or indirectly manage and/or provide a service or services to the client using the network system 130, or that communicate with or receive information form others that directly or indirectly provide the services or support to such client. The computer 135 selects, organizes, and/or administers satisfaction survey questions to be provided to the clients and will alternatively be referred to as survey computer 135. The computer 135 is also useable for receiving responses to the survey questions. A database 140 for storing and maintaining survey questions and responses is connected to the survey computer 135. Accordingly, the survey computer 135 is able to retrieve survey questions from the database 140 as well as communicate survey response data to and from the database 140.

A network server 115 is coupled between the survey computer 135 and the Internet and/or electronic mail network 150. A network server 165 of the client system 160 is also connected to the Internet and/or electronic mail network 150. The client network server 165 is further connected to client computers 170, 175 and 180 by data network 168. In accordance with the invention, the client representatives using the computers 170, 175 and 180 should be directly or indirectly receiving the services or support provided by the service provider, or communicate with or receive information from others that directly or indirectly receive the services or support provided by the service provider. It is also advantageously possible for either or both network servers 115 and 165 to provide an Internet firewall security capability.

It should be readily understood that the respective service provider and client network systems 110 and 160 are depicted as two and three computers, respectively, for illustration and ease of discussion purposes only. The invention is equally applicable to those client and service provider network systems having a significantly larger number of computers coupled thereto.

In operation, the survey computer 135 can provide a first set of survey questions obtained from the database 140 to respective service provider representatives using the computers 120 and 125. Correspondingly, the service provider network system 110 enables service provider representatives using the computers 120 and 125 to provide their responses to such survey questions to the survey computer 135 for recording in the database 140. Likewise, the survey computer 135 can provide a second set of survey questions obtained from the database 140 to respective client representatives using the computers 170, 175 and 180 via the network server 115, Internet and/or electronic mail network 150, and network server 165.

The particular configuration employed for the network systems 110 and 160 depicted in FIG. 1 is for illustration purposes only. The particular method or methods employed by the service provider network system 110 to communicate the survey questions to the respective service provider and client representatives using the computers 120 and 125 and computers 170, 175 and 180, as well as for receiving such representatives corresponding responses back to the survey computer 135 is not critical for practicing the present invention. It is only necessary according to the survey method of the invention that the survey computer 135 communicate respective survey questions to and receive responses from respective service provider and client representatives using the computers 120 and 125 and computers 170, 175 and 180. It is possible to provide access to the representatives using the computers 120 and 125 to a website established for providing such survey questions form the survey computer 135 and gathering the representatives' responses for communication back to the survey computer 135.

Moreover, it is also possible to employ different network configurations for communicating the survey questions between a survey computer and service provider and client representatives than that shown in FIG. 1 to practice the principles of the invention. For example, it is possible to eliminate the respective network systems 110 and 160 and correspondingly, communicate survey questions to and receive responses from e-mail enabled computers of service provider and client representatives using conventional e-mail techniques. In a similar manner, the method of the present invention can also be implemented using computers of service provider and client representatives that have access to the Internet whereby the survey questions are provided and responses gathered by an interactive web-page.

Further, in accordance with the invention, it is not critical for the functions of the survey computer 135 to be performed by a stand-alone computer as depicted in the configuration 100. It is possible for such functions to be implemented on a computer performing other operations for the service provider with the corresponding database 140 residing in memory of such computer.

Figure 2:
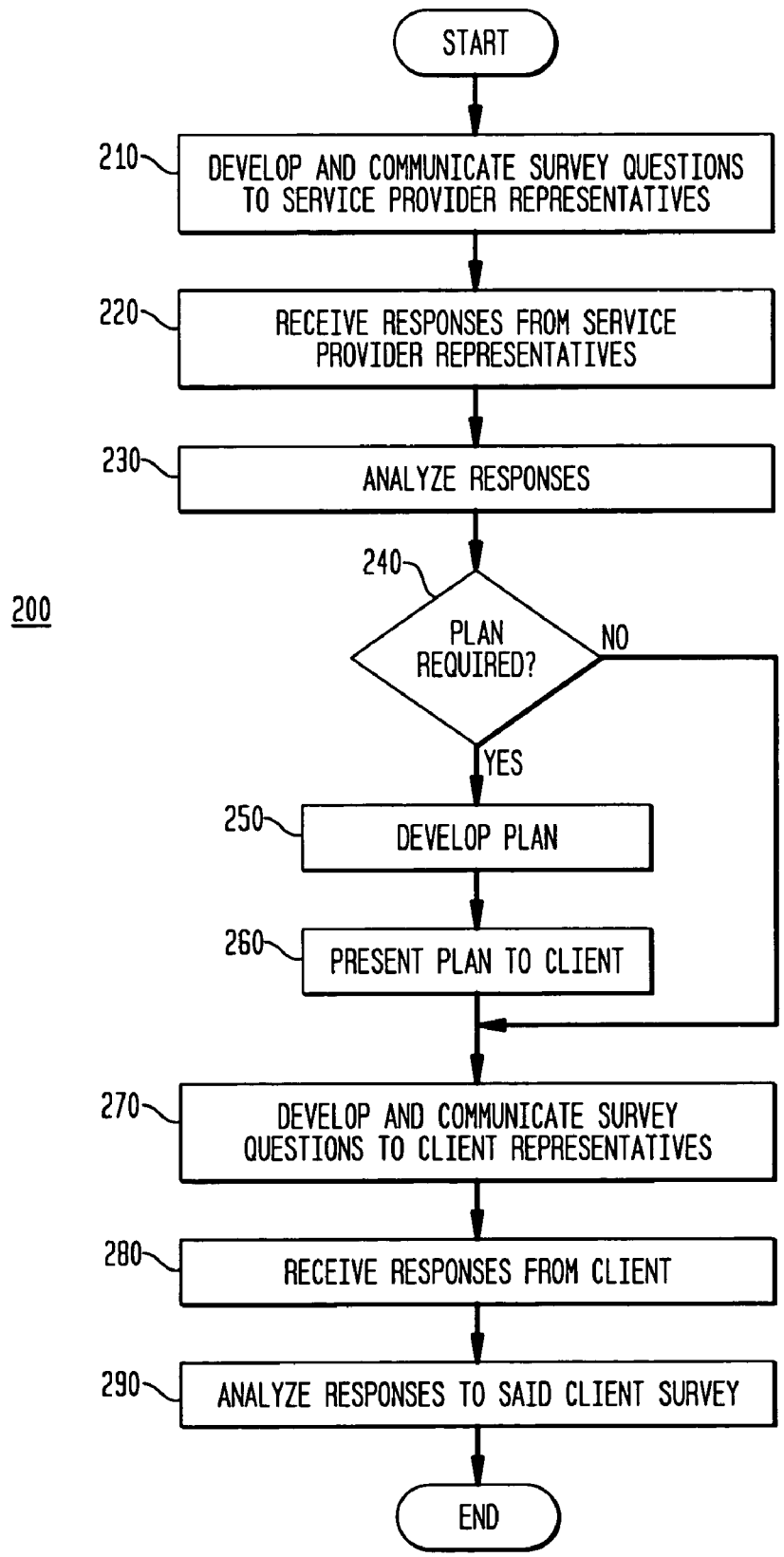
FIG. 2 illustrates an exemplary survey flow diagram in accordance with the principles of the invention.

FIG. 2 is an exemplary flow diagram 200 of an improved survey method in accordance with the invention. The steps of the flow diagram 200 in FIG. 2 will be described with respect to the configuration 100 of FIG. 1. In step 210, a particular set of survey questions is developed and communicated by the survey computer 135 to certain service provider representatives that use the computers 120 and 125 and have provided or are providing services to the client to be surveyed, or that have specific knowledge regarding the services or support provided by the service provider to such client. The responses to such survey questions entered by the service provider representatives into the computers 120 and 125 are communicated to the survey computer 135. Step 220 illustrates the receipt of these responses by the survey computer 135.

In step 230, the received responses are analyzed by, for example, a survey administrator or management individual or team of a service provider, to identify whether development of a modification or remedial plan may be beneficial for one or more areas of service or support provided by the service provider to the client. Also, it is possible for the responses to the survey questions to be in a form that enables the survey computer 135 or another computer to process such responses to identify those areas of service or support for which modification or remedial plan may be beneficial. In particular, it is advantageous to employ numerical value scores to represent the responses to the survey. For example, it is possible to have the survey taker enter or select numerical values for survey questions. In the alternative, numerical values can be assigned to corresponding non-numerical responses regarding respective levels of satisfaction.

Based on the analysis in step 230 a decision is made in step 240 as to whether a modification or remedial plan will be developed. If the survey results indicate that a plan is not required then the method proceeds to step 270. In step 270, a client survey is developed and communicated by the survey computer 135 via the network servers 115 and 165 and Internet or e-mail network 150 to client representatives using the computers 170, 175 and 180 as described in greater detail below. In the alternative, if, in step 240, the analysis indicates that a modification or remedial plan would be beneficial for certain services provided to the client by the service provider then the method proceeds to step 250.

In step 250, a modification or remedial plan is developed for modifying or altering certain services or the manner in which such services or support are provided to the client. Then, in step 260, the plan is presented by service provider representatives to client representatives including at least one of the representatives using a corresponding one of the computers 170, 175 or 180. The manner in which such plan is presented is not critical to the present invention. Accordingly, it is possible for the service provider to present this plan in an on-line presentation or via telephone or video conference or at in person presentation.

After the plan is presented to the client in step 260, a client survey is developed and communicated by the survey computer 135 via the network servers 115 and 165 and Internet or e-mail network 150 to client representatives using the computers 170, 175 and 180 as is illustrated in step 270. The client survey may be developed by creating survey questions and, for example, multiple choice response options. In the alternative, such questions and response options may be selected from previously created survey questions and corresponding response options contained in the database 140.

The developed client survey should contain questions that address the provided services and support by the service provider as well as how such service or support will be effected by implementation of the presented modification or remedial plan. Responses to such client survey questions are entered by the client representatives into computers 170, 175 and 180 which communicate these responses to the survey computer 135. As is previously described with respect the service provider survey questions in step 240, it is advantageous to employ numerical value scores to represent the responses to the survey. It is possible to have the survey taker enter or select numerical values for survey questions. In the alternative, numerical values can be assigned to corresponding non-numerical responses regarding respective levels of satisfaction.

Receipt of the client responses by the survey computer 135 is indicated in step 280. Lastly, in step 290, the responses are analyzed to provide feedback to the service provider regarding provided service and support as to the extent any proposed modification or remedial plan. As a consequence, with a single survey of the client according to the invention, the service provider will not only know the satisfaction of the client with the provided service or support, but will advantageously also know what satisfaction the client will likely have with the implementation of the proposed modification or remedial plan. Accordingly, the method of the invention will enable a service provider to more quickly adapt provided services and support to a client's specific needs with a reduced number of client surveys relative to conventional survey techniques. Conventional survey techniques would have disadvantageously required at least two surveys of a client over likely a longer period of time—one survey before a plan is developed and a second survey after the plan is implemented—to achieve similar results as the survey method according to the invention.

The steps of the method 200 in FIG. 2 were depicted as occurring in a specific order and sequence for illustration purposes only. It is possible to perform certain of these steps in a different order or simultaneously in accordance with the invention. For example, it would be possible to develop a portion or all of the surveys for the service provider representatives at any time prior to transmission of such survey questions to their intended recipients.

It is advantageous to employ survey questions having numeric response regarding the respective level of satisfaction of the client representative responding to the survey. In this manner, it is possible to easily calculate an average level of satisfaction of the client representatives responding to the survey. Moreover, in determining satisfaction level scores in respective areas of service and support important or less important to the client and/or service provider, such response values may be adjusted by corresponding weighting factors. Such weighting factor adjustment may be in the form of multiplying/dividing the response scores or averages with corresponding weighting factors to produce weighted scores. In certain instances, it may be beneficial to create an offset weighting factor adjustment for respective response values or averages by adding or subtracting by a weighting factor.

Figure 3:
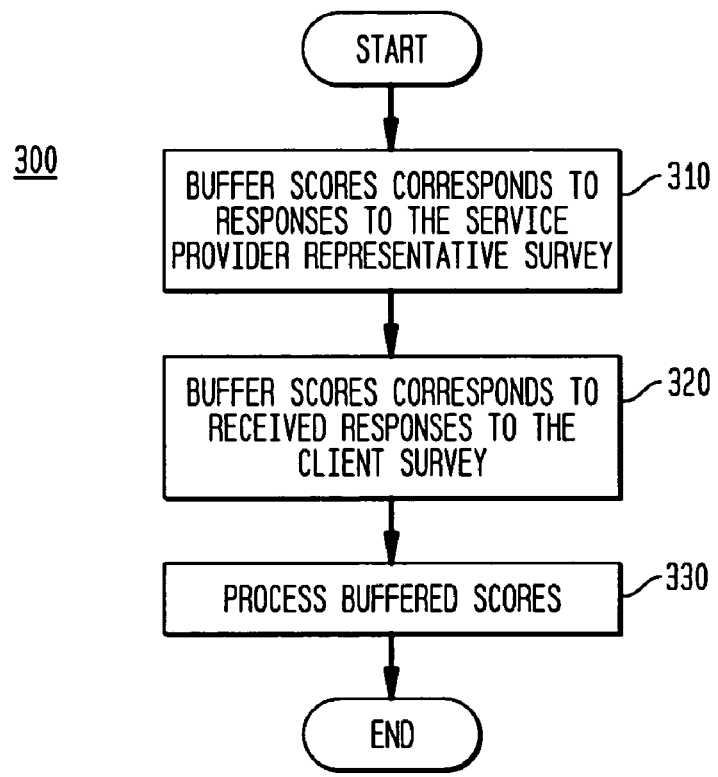
FIG. 3 illustrates an exemplary flow diagram of an improved survey process of a survey computer in accordance with the invention.

An exemplary analysis process 300 performed by the survey computer 135 to carry out the required analysis operations of the survey method 200 is depicted in FIG. 3. In accordance with the analysis process 300, the survey computer 135 buffers or stores data contained in received responses to the service provider representative surveys in the database 140 in step 310. In a similar manner, the survey computer 135 then buffers or stores data contained in received responses to the client surveys in the database 140 as indicated in step 320. Lastly, in step 330, the survey computer 135 processes the respective buffered response data by at least comparing directly or indirectly certain respective data buffered in steps 310 and 320. An advantage gained by comparing the service provider representative survey responses and the client survey responses include identifying, quantitatively, those areas of mismatch between services and value. More specifically, the service provider may perceive that it is delivering an adequate level of service and therefore, continue to provide such service without modification based on such perception. However, in contrast, the client may view the level of delivered services differently even though such client has not previously expressed dissatisfaction. Accordingly, the invention further facilitates normalization of respective perceptions between the service provider representatives and the client regarding the actual client satisfaction.

In accordance with another aspect of the invention, it is advantageous to employ service-based questions and value-based questions in the client survey developed in step 270 of the method 200 in FIG. 2. As used herein, service-based questions elicit feedback regarding expectations on contracted for services and the actual services provided. These questions reflect how well service provider delivers its contractual commitments. Value-based questions elicit feedback regarding intangible benefits the service provider provides relating to clients business objectives beyond contracted service. Value-based questions measure how well areas service provider's provided service correlate with the clients' business goals and the level that such service contributes to the client's success. Accordingly, responses to value-based survey questions are indicators of the extent of a client's dependence on its service provider for achieving such business success.

Figure 4:
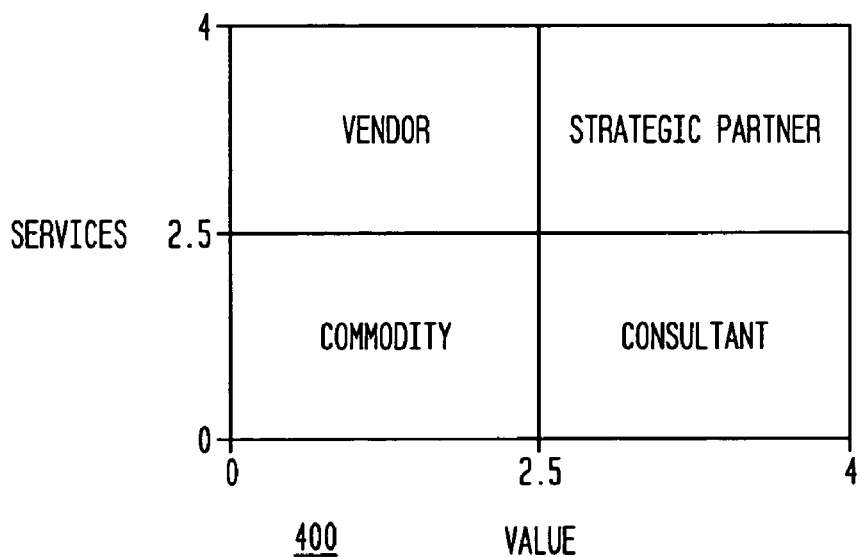
FIG. 4 illustrates an exemplary diagram presenting the service-value index of survey results in accordance with another aspect of the invention.

It is further advantageous in accordance with this aspect of the invention to process and/or analyze responses to the service-based and value-based questions in a manner to create a corresponding service-value index. An illustrative service-value index is graphically depicted as index graph 400 in FIG. 4. The graph 400 is divided into four quadrants, based on, for example, a 1-4 scale for illustration purposes only. It is possible for the depicted graph 400, for example, to process and/or analyze the responses to survey questions to produce services-based and/or value-based weighted scores. As a consequence, a mean, median or any other statistical averaging could then employed on such weighted scores to determine a plot point relative to the services-based and value-based axes in the graph 400.

It would then be possible to characterize the nature and quality of the services provided to the client as, for example, strategic partner, consultant, vendor or commodity, based on whether such graphed point appears in the following corresponding quadrants:

Strategic Partner: High Value (2.5-4.0), High Service (2.5-4.0)
Consultant: High Value (2.5-4.0), Low Service (0-2.5)
Vendor: Low Value (0-2.5), High Service (2.5-4.0)
Commodity: Low Value (0-2.5), Low Service (0-2.5)

It should be readily understood that previously description of one particular manner for determining a service-value is for illustration purposes only and that numerous other techniques are useable to determine a corresponding service-value index in accordance with the invention including, for example, employing different scales, different weighting factors, different statistical analysis or omitting the use of weighting factors. It is further possible to employ different representations of a service-value index than graph 400 including three-dimensional or greater graph.

It is to be understood that the invention is not limited to the illustrated and described forms of the invention contained herein. By way of further example, the invention can be embodied as instructions for execution on a single computer, or by one or more general purpose computers executing such code. Providing the processes and functions or accessing the methods or processes when provided by others are specifically within contemplation of the invention. It will be apparent to those skilled it the art that various changes may be made without departing for the scope of the invention and the invention is not considered limited to what is shown in the drawings and described in the specification.

What is claimed is:

1. A method for a service provider client survey comprising:
    electronically providing, via a survey computer, a first survey to a representative of a service provider providing a service to a client;
    developing a service plan for the client based on scores corresponding to responses from the representative of the service provider to the first survey to address at least one aspect of the service to be changed;
    presenting the service plan to the client;
    prior to implementing the service plan, electronically providing a second survey to a client representative of the client based on the service plan and performance of the service provider, the second survey including service-based questions and value-based questions, the service-based questions eliciting feedback regarding expectations on contracted for services and the actual services provided, the value-based questions eliciting feedback regarding intangible benefits the service provider provides relating to client business objectives beyond contracted services;
    electronically generating a service-value index based on the responses from the client representative, wherein a service portion of the service-value index is based on responses to the service-based questions and a value portion of the service-value index is based on responses to the value-based questions; and
    characterizing a type of service provider-client relationship based on a comparison of the service portion of the service-value index to a first threshold value and a comparison of the value portion of the service-value index to a second threshold value.

2. The method according to claim 1 further comprising analyzing scores corresponding to the responses from the second survey.

3. The method according to claim 1 wherein the developing includes establishing processes for aspects of the service that received survey scores lower than a threshold, wherein aspects of the service that received scores above the threshold provide guidance for establishing the processes.

4. The method according to claim 1 wherein the service-value index is based on at least one weighted average score based on response data from the client.

5. The method according to claim 4 wherein the weighted average score is based on scores for the responses to the second survey and a weighting factor.

6. The method according to claim 1 wherein the service-value index is generated using a services-based weighted average score based on response scores to the service-based questions in the second survey.

7. The method according to claim 6 wherein the service-value index is generated using a value-based weighted average score based on response scores to the value-based questions in the second survey.

8. The method according to claim 7 wherein the service-value index is generated using a weighted average score based on the value-based weighted average score and the services-based weighted average score.

9. The method according to claim 1 wherein providing, via the survey computer, the first survey to the representative of the service provider comprises:
    retrieving, via the survey computer, survey questions from a database; and
    displaying the survey questions via second and third computers communicatively coupled to the survey computer.

10. The method according to claim 1, wherein the type of service provider-client relationship is one of a strategic partner relationship, a consultant relationship, a vendor relationship, or a commodity relationship.

11. A service provider performance survey computer program stored on a tangible computer readable medium that, when executed, causes a machine to:
    buffer first scores corresponding to received responses to a first survey of a representative of a service provider providing a service to a client;
    buffer second scores corresponding to received responses to a second survey of a client representative based on the service plan and performance of the service provider, wherein the second survey of the client representative is administered before implementing the service plan, the second survey including service-based questions and value-based questions, the service-based questions eliciting feedback regarding expectations on contracted for services and the actual services provided, the value-based questions eliciting feedback regarding intangible benefits the service provider provides relating to client business objectives beyond contracted services;
    generate a service-value index based on the second scores, wherein a service portion of the service-value index is based on responses to the service-based questions and a value portion of the service-value index is based on responses to the value-based questions; and
    characterize a type of service provider-client relationship based on a comparison of the service portion of the service-value index to a first threshold value and a comparison of the value portion of the service-value index to a second threshold value.

12. The service provider performance survey computer program stored on a tangible computer readable medium according to claim 11 wherein the first and second scores include at least one weighted average score.

13. The service provider performance survey computer program stored on a tangible computer readable medium according to claim 12 wherein the at least one weighted average score is based on an average score for a plurality of scores and a weighting factor.

14. The service provider performance survey computer program stored on a tangible computer readable medium according to claim 11 that, when executed, cause the machine to process the first scores and the second scores by determining a services-based weighted average score based on responses to the service-based questions.

15. The service provider performance survey computer program stored on a tangible computer readable medium according to claim 11 that, when executed, cause the machine to process the first scores and the second scores by determining a value-based weighted average score based on responses to the value-based questions.

16. The service provider performance survey computer program stored on a tangible computer readable medium according to claim 11 that, when executed, cause the machine to process the first scores and the second scores by determining a weighted average score based on a service-based weighted average score and a value-based weighted average score.

17. A computer readable medium having instructions stored thereon that, when executed, cause a machine to:
provide a first survey to a representative of a service provider providing a service to a client;
store a service plan for the client based on scores corresponding to responses from the representative of the service provider to the first survey to address at least one aspect of the service to be changed;
present the service plan to the client;
prior to implementing the service plan, provide a second survey to a client representative of the client based on the service plan and performance of the service provider, the second survey including service-based questions and value-based questions, the service-based questions eliciting feedback regarding expectations on contracted for services and the actual services provided, the value-based questions eliciting feedback regarding intangible benefits the service provider provides relating to client business objectives beyond contracted services;
generate a service-value index based on the responses from the client representative, wherein a service portion of the service-value index is based on responses to the service-based questions and a value portion of the service-value index is based on responses to the value-based questions; and
characterize a type of service provider-client relationship based on a comparison of the service portion of the service-value index to a first threshold value and a comparison of the value portion of the service-value index to a second threshold value.

18. The computer readable medium according to claim 17 having instructions stored thereon that, when executed, cause the machine to:
generate a weighting factor for at least one client response associated with the second survey based on an importance level to the client of an area of service associated with the at least one client response; and
represent analyzed survey data in the service-value index, wherein the service-value index is based on the weighting factor.

* * * * *